US007245224B2

(12) United States Patent
Jayaram et al.

(10) Patent No.: US 7,245,224 B2
(45) Date of Patent: Jul. 17, 2007

(54) METHODS AND SYSTEMS FOR DIAGNOSING PROJECTION DEVICE FAILURE

(75) Inventors: Subramanian Jayaram, Austin, TX (US); Satchidananda Mishra, Austin, TX (US); Masayoshi Sakai, Round Rock, TX (US)

(73) Assignee: Dell Products LP, Round Rock, TX (US)

( * ) Notice: Subject to any disclaimer, the term of this patent is extended or adjusted under 35 U.S.C. 154(b) by 61 days.

(21) Appl. No.: 10/976,270

(22) Filed: Oct. 28, 2004

(65) Prior Publication Data
US 2006/0033633 A1 Feb. 16, 2006

Related U.S. Application Data

(60) Provisional application No. 60/601,310, filed on Aug. 13, 2004.

(51) Int. Cl.
*G08B 21/00* (2006.01)

(52) U.S. Cl. .................. 340/635; 340/641; 315/129; 315/291; 361/247; 353/85; 362/15

(58) Field of Classification Search ............... 340/635, 340/641, 642, 931, 458; 315/129, 291, 387, 315/308; 361/247, 264; 353/85; 362/15, 362/5
See application file for complete search history.

(56) References Cited

U.S. PATENT DOCUMENTS

| 3,562,580 | A | | 2/1971 | Blomgren et al. | |
|---|---|---|---|---|---|
| 4,318,031 | A | * | 3/1982 | Lonseth et al. | 315/133 |
| 5,311,101 | A | * | 5/1994 | Noriki et al. | 315/129 |
| 5,394,062 | A | * | 2/1995 | Minarczyk et al. | 315/129 |
| 5,442,257 | A | * | 8/1995 | Mitsumoto | 315/129 |
| 6,127,782 | A | | 10/2000 | Flory et al. | |
| 6,127,787 | A | * | 10/2000 | Strong et al. | 315/294 |
| 6,294,879 | B1 | * | 9/2001 | Nagase et al. | 315/209 R |
| 6,534,988 | B2 | * | 3/2003 | Flory, IV | 324/414 |
| 6,779,896 | B2 | * | 8/2004 | Luerkens et al. | 353/84 |
| 6,909,406 | B2 | * | 6/2005 | Wilburn et al. | 345/3.1 |
| 2002/0047547 | A1 | * | 4/2002 | Flory et al. | 315/129 |
| 2004/0170016 | A1 | | 9/2004 | Pellegrino | |
| 2005/0280640 | A1 | * | 12/2005 | Bonorden et al. | 345/204 |

FOREIGN PATENT DOCUMENTS

JP 09-13077 5/1997

OTHER PUBLICATIONS

Search Report; SG200505235-2; Sep. 11, 2006; 4 pages.

* cited by examiner

*Primary Examiner*—Jeffery Hofsass
*Assistant Examiner*—Edny Labbees
(74) *Attorney, Agent, or Firm*—O'Keefe, Egan, Peterman & Enders, LLP

(57) ABSTRACT

Projection device failure may be diagnosed by sensing improper operation of projection lamp ignitor circuitry. An ignitor failure indicator may be activated based on a sensed failure in the operation of the lamp ignitor circuitry to prevent incorrect projection lamp failure notification.

15 Claims, 3 Drawing Sheets

METHODS AND SYSTEMS FOR DIAGNOSING PROJECTION DEVICE FAILURE

This application claims priority on now abandoned U.S. provisional patent application Ser. No. 60/601,310 filed on Aug. 13, 2004, which is incorporated herein by reference in its entirety.

BACKGROUND OF THE INVENTION

1. Field of the Invention

This invention relates generally to projection devices, and more particularly to methods and systems for diagnosing projection device failure.

2. Description of the Related Art

Projection devices include projectors that use projection lamps to display images on a wall or other suitable viewing surface. Such projectors may be configured to display images provided by analog and digital connections that are compatible with PC, television and video standards. Projectors may be provided with a lamp sensor that monitors lamp current and triggers a lamp failure light if the projector lamp fails to ignite when powered on (e.g., after four ignition attempts). When other power indicators of the projector are illuminated and the projector fan is running, the illuminated lamp failure light indicates to the user that the projector lamp has failed and needs to be replaced. A replacement lamp may then be ordered by the user or may be shipped to the user by the manufacturer, e.g., when still covered under warranty. Projectors may also be provided with an end of life indicator that notifies a user when the lamp has reached its end of life.

A projector lamp failure light does not distinguish between a failed projector lamp and a failed ignitor circuit. Thus, a failure in the ignitor circuit will be viewed by a user as a lamp failure, and may result in a failed attempt to restore projector operation by purchasing and installing a new replacement lamp. For projector products still covered under warranty, a new projector lamp may be shipped to the user in a wasted attempt to restore operation of a projector with a failed ignitor circuit.

SUMMARY OF THE INVENTION

Disclosed herein are methods and systems for diagnosing projection device failure and for preventing incorrect projection lamp failure notification by sensing improper operation of projection lamp ignitor circuitry and providing an indication of the same. Such incorrect lamp failure notification may occur when a lamp failure light is activated due to a failure in the ignitor circuitry (ballast circuit), rather than due to a defective or burned out projection lamp. In one embodiment, the disclosed methods and systems may be implemented using a separate indicator circuit that monitors the input to the projector lamp by sensing the ignition voltage to the projector lamp. If the ignition voltage is below a specified value, an ignitor failure indicator may be activated by the indicator circuit, e.g., a light emitting diode ("LED") indicator light that turns on and stays on.

In one embodiment, a projector may be equipped with both lamp failure and ignitor failure indicator systems to facilitate proper diagnosis of projector failure. In a case where only the projector lamp fails (i.e., the ignitor circuitry is functioning properly), the lamp failure indicator (e.g., a first LED light) is activated, while the ignitor failure indicator (e.g., a second LED light) remains off. Activation of only the lamp failure indicator allows for easy identification that the projector lamp has encountered a failure and needs to be replaced. However, in a case where the ignitor circuitry supplies insufficient voltage (or no voltage) for projector lamp ignition, both the ignitor failure indicator and lamp failure indicators are activated. Activation of both lamp failure and ignitor failure indicators is an indication that a projector failure is due to an electronics failure in the ignitor circuitry, and that the projector needs to be repaired. With the advantage of this indication of ignitor circuitry failure, wasted time and efforts associated with unsuccessful attempts to replace the projector lamp may be avoided.

Thus, in one respect disclosed herein is a method of sensing lamp ignitor circuitry failure in a projection device, including the steps of: sensing operation of the lamp ignitor circuitry; and providing an indication of ignitor failure based on a sensed failure in said operation of said lamp ignitor circuitry. The step of sensing operation of the lamp ignitor circuitry may include measuring lamp ignitor voltage provided by the lamp ignitor circuitry to a projector lamp of the projection device; and the method may include activating an ignitor failure indicator based on a magnitude of the measured lamp ignitor voltage. The method may further include comparing a magnitude of the measured lamp ignitor voltage to a specified voltage magnitude; and activating the ignitor failure indicator if the measured voltage magnitude is less than the specified voltage magnitude. The method may further include the steps of: attempting to ignite the projector lamp; sensing whether the projector lamp is ignited; and activating a lamp failure indicator if the projector lamp fails to ignite. In one embodiment of this method, the ignitor failure indicator may only be activated if the lamp failure indicator is activated. In another embodiment, the step of sensing operation of the lamp ignitor circuitry may be performed after the step of activating the lamp failure indicator. The method may be implemented with a projection device that is configured to display information based on signals received from an information handling system.

In another respect, disclosed herein is a system for sensing lamp ignitor circuitry failure in a projection device, including: ignitor detection circuitry configured to sense operation of the lamp ignitor circuitry; and an ignitor failure indicator coupled to the ignitor detection circuitry. In one embodiment, the ignitor detection circuitry may be configured to sense operation of the lamp ignitor circuitry by measuring lamp ignitor voltage provided by the lamp ignitor circuitry to a projector lamp of the projection device; and to activate the ignitor failure indicator based on a magnitude of the measured lamp ignitor voltage. In this regard, the ignitor detection circuitry may be configured to compare a magnitude of the measured lamp ignitor voltage to a specified voltage magnitude; and to activate the ignitor failure indicator if the measured voltage magnitude is less than the specified voltage magnitude. In one embodiment, the system may further include: lamp ignition detection circuitry configured to sense whether the projector lamp is ignited; and a lamp failure indicator coupled to the lamp ignition detection circuitry. In one embodiment, the ignitor detection circuitry may be configured to only activate the ignitor failure indicator if the lamp failure indicator is activated. In another embodiment, the ignitor detection circuitry may be configured to sense operation of the lamp ignitor circuitry after the lamp failure indicator is activated. The system may be implemented with a projection device configured to display information based on signals received from an information handling system.

In another respect, disclosed herein is a projection device, including a projection lamp, lamp ignitor circuitry coupled to the projection lamp, ignitor detection circuitry configured to sense operation of the lamp ignitor circuitry, and an ignitor failure indicator coupled to the ignitor detection circuitry. In one embodiment, the ignitor detection circuitry may be configured to sense operation of the lamp ignitor circuitry by measuring lamp ignitor voltage provided by the lamp ignitor circuitry to the projector lamp of the projection device; and to activate the ignitor failure indicator based on a magnitude of the measured lamp ignitor voltage. In this regard, the ignitor detection circuitry may be configured to compare a magnitude of the measured lamp ignitor voltage to a specified voltage magnitude; and to activate the ignitor failure indicator if the measured voltage magnitude is less than the specified voltage magnitude. In one embodiment, the projection device may further include: lamp ignition detection circuitry configured to sense whether the projector lamp is ignited; and a lamp failure indicator coupled to the lamp ignition detection circuitry. In one embodiment, the ignitor detection circuitry may be configured to only activate the ignitor failure indicator if the lamp failure indicator is activated. In another embodiment, the ignitor detection circuitry may be configured to sense operation of the lamp ignitor circuitry after the lamp failure indicator is activated. The projection device may be configured to display information based on signals received from an information handling system.

DESCRIPTION OF ILLUSTRATIVE EMBODIMENTS

Figure 1:
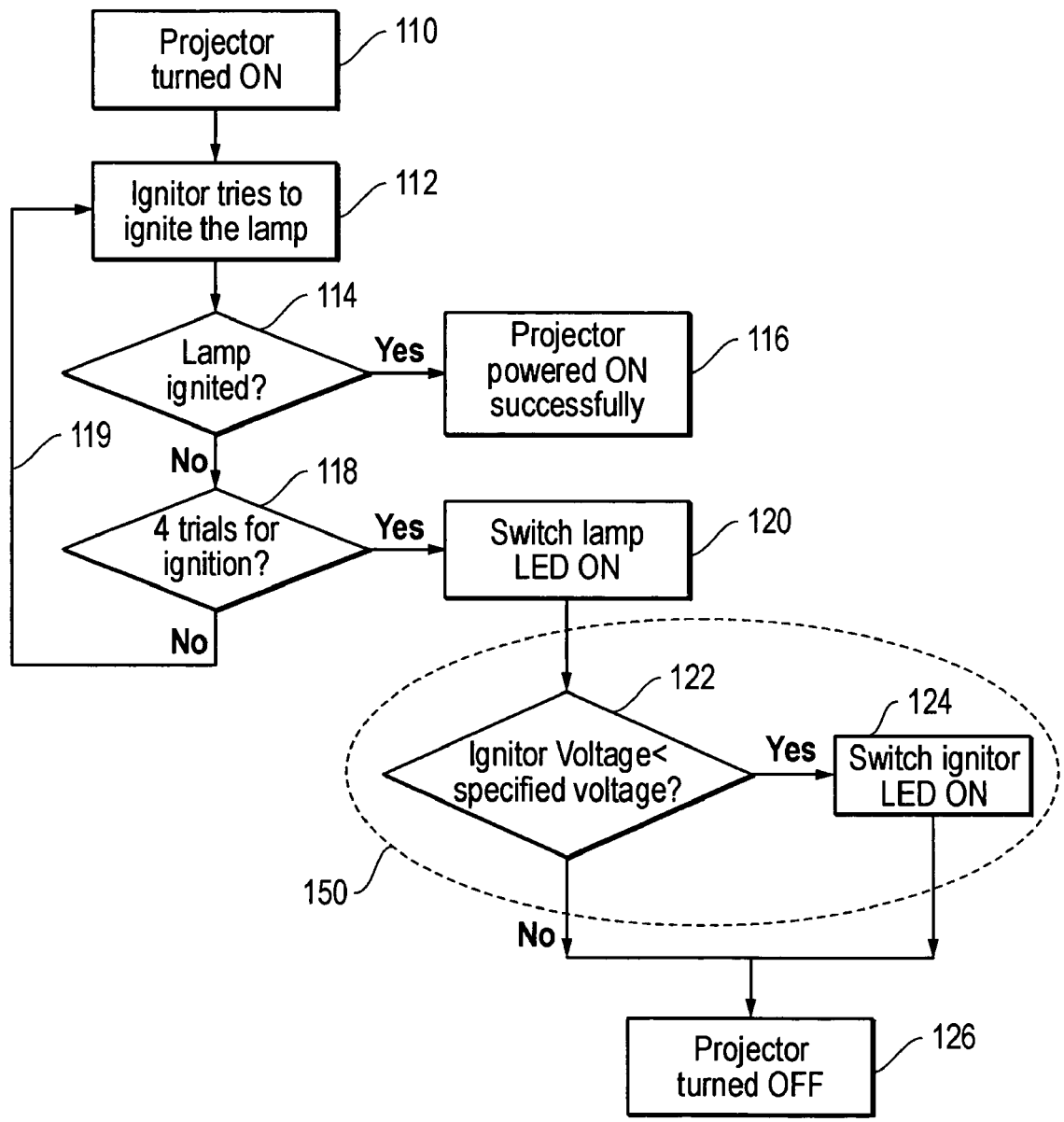
FIG. 1 is a flow diagram illustrating methodology according to one embodiment of the disclosed methods and systems.

FIG. 1 is a flow diagram illustrating methodology that may be implemented to diagnose projector failure in one exemplary embodiment of the disclosed methods and systems. The projector is turned on in step 110, and the ignition circuitry attempts to light the projector lamp (e.g., mercury vapor lamp) in step 112. Lamp ignition detection circuitry determines whether the projector lamp was successfully ignited in step 114, e.g., by sensing lamp current. If the projector lamp ignites, then the projector is powered on successfully as indicated in step 116. However, if it is determined in step 114 that the projector lamp was not successfully ignited, then one or more additional attempts (e.g., for a total of four attempts) may be optionally made to ignite the projector lamp as indicated by optional return flow path 119 from step 118 to step 112. If the projector lamp ignites during any one of these additional attempt/s, then the projector is powered on as indicated in step 116. After a specified number of one or more unsuccessful attempts to ignite the projector lamp have been made, then a lamp failure indicator (e.g., a first LED light or first state of a tri-state LED light) may be activated in step 120.

Still referring to FIG. 1, ignitor circuitry (ballast circuit) voltage may be monitored in step 122, e.g., by a voltage detector circuit in one exemplary embodiment. If the ignitor voltage supplied by the ignitor circuitry is less than a specified voltage (e.g., the voltage required to successfully ignite the projector lamp), then an ignitor failure indicator (e.g., a second LED light or second state of a tri-state LED light) may be activated in step 124, and the projector power may be optionally turned off (e.g., automatically or manually by the projector operator) in step 126. At this point, both the lamp failure and ignitor failure indicators will be activated, indicating a failure has occurred in the ignition circuitry and that the projector needs to be repaired.

However, if the ignitor voltage is found to be equal to or greater than the specified voltage in step 122, then the ignitor failure indicator is not activated and the projector power optionally turned off (e.g., automatically by automatic shutdown circuitry or manually by the projector operator) in step 126. At this point, only the lamp failure indicator is activated, indicating that the projector lamp has failed or is defective and needs to be replaced.

Figure 2:
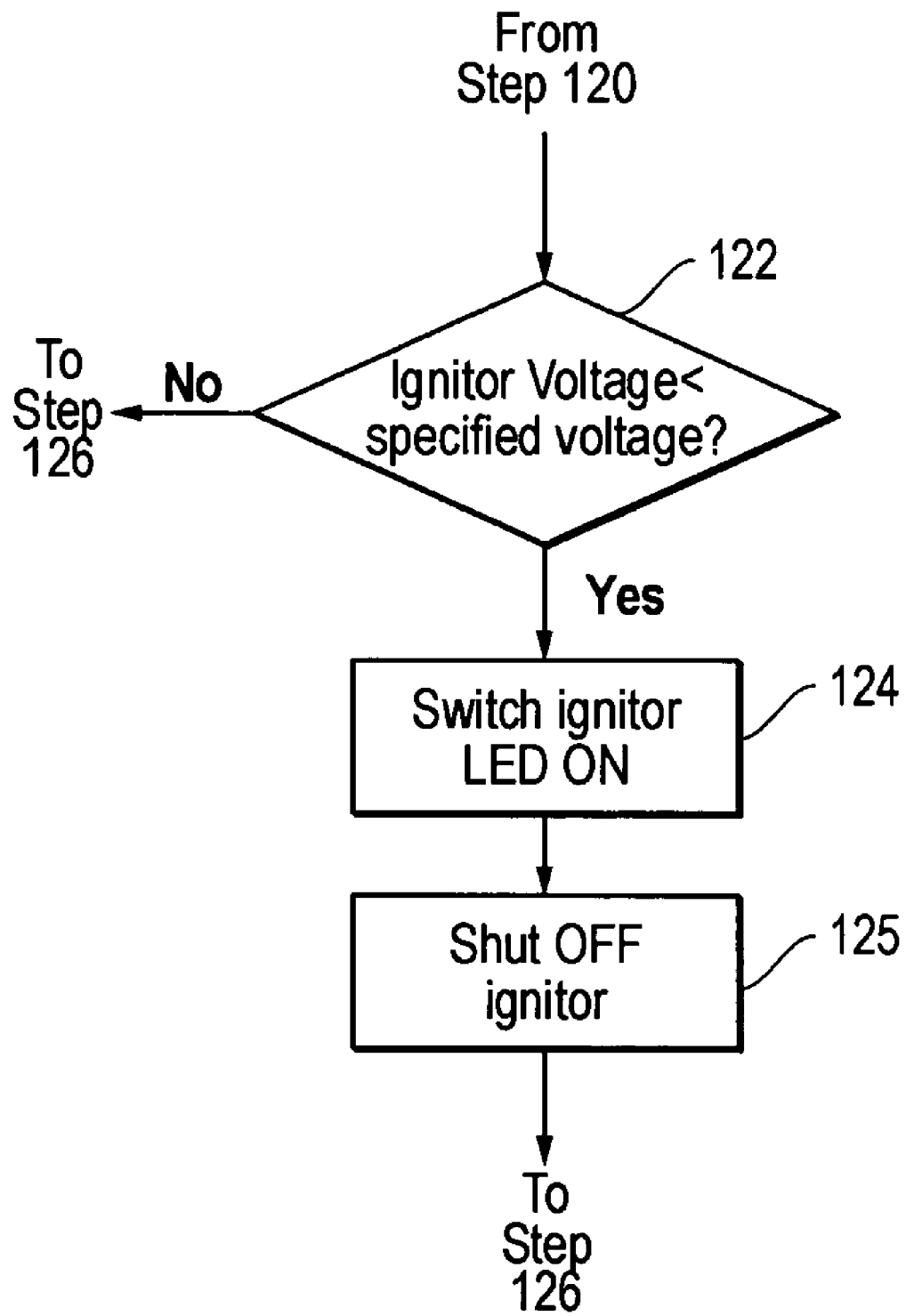
FIG. 2 is a flow diagram illustrating methodology according to another embodiment of the disclosed methods and systems.

FIG. 2 illustrates an optional embodiment in which the ignitor circuitry is optionally shutoff (e.g., in addition to the performance of steps 122 to 124 of FIG. 1 as indicated in outline by dashed line 150) to prevent further ignition tries. In this embodiment, ignitor circuitry voltage may be monitored in step 122 in a manner as previously described. If the ignitor voltage supplied by the ignitor circuitry is less than the specified voltage and the ignitor failure indicator is activated in step 124, then the ignitor circuitry is shut off to prevent further ignition tries as indicated by step 125 of FIG. 2.

FIG. 1 illustrates one exemplary embodiment in which the methodology of steps 122 to 126 follows the methodology of steps 110 to 120. In this regard, it will be understood that in another embodiment the methodology of steps 122 to 126 may be implemented separately, simultaneously and/or independently to the methodology of steps 110 to 120, and that steps 110 to 120 need not be present. It will also be understood that lamp failure and/or ignitor failure indicators may be implemented using any suitable form of indicating mechanism/s other than separate indicator lights, e.g., using a single multi-state indicator such as multi-state LED capable of displaying a different respective color to reflect each of lamp failure or ignitor circuit failure. Furthermore, although one embodiment for sensing operation of ignitor circuitry is described herein in which a separate indicator circuit is employed to monitor the input to a projector lamp by sensing the ignition voltage to the projector lamp, it will be understood that any other methodology and/or configuration of one or more circuits that is suitable for sensing proper operation of ignitor circuitry may be employed.

Figure 3:
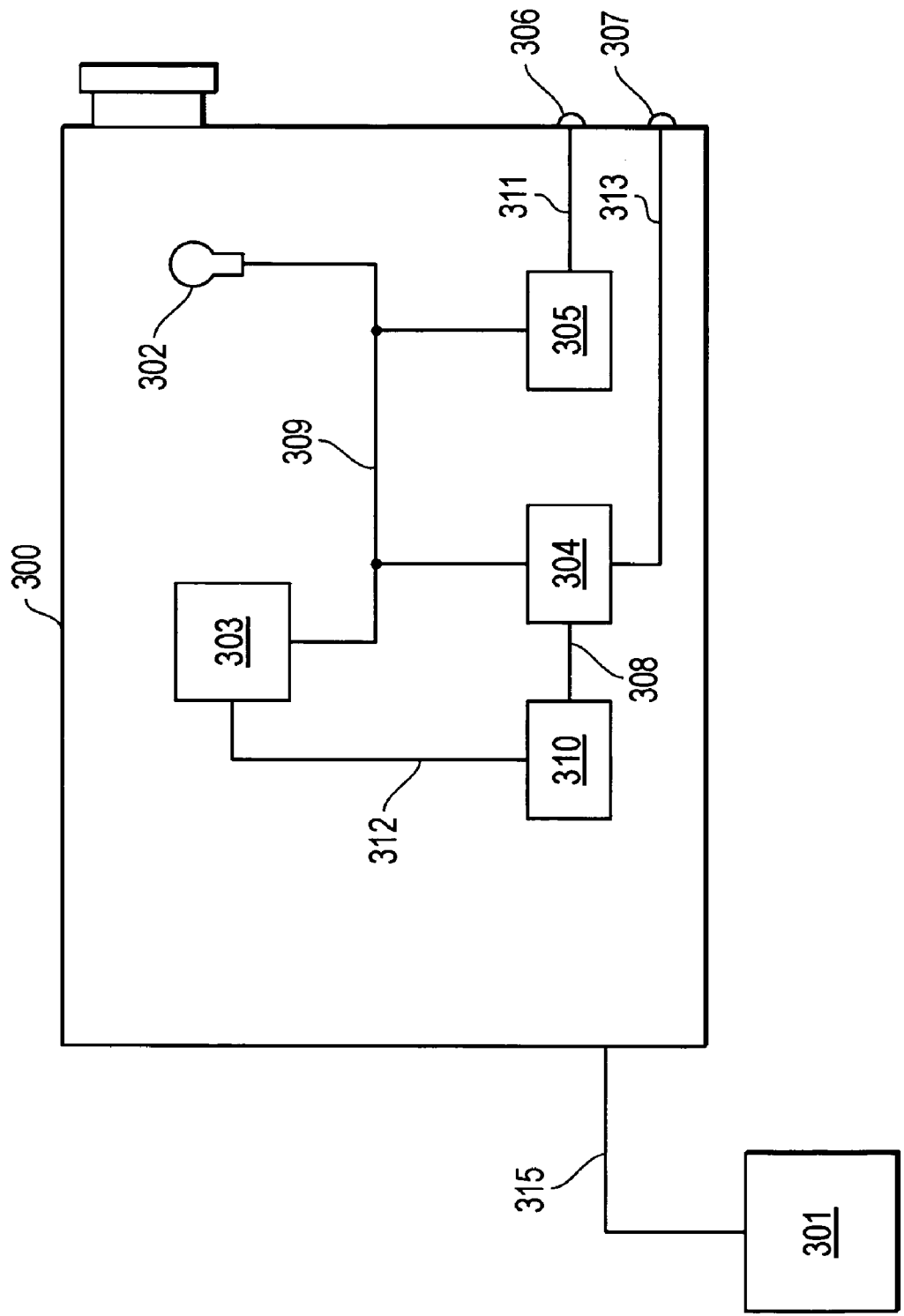
FIG. 3 is a simplified block diagram of a projection device according to one embodiment of the disclosed methods and system.

FIG. 3 is a simplified block diagram of projection device 300 configured according to one exemplary embodiment of the disclosed methods and systems, e.g. to implement the methodology of FIG. 1 and/or 2. As shown in FIG. 3, projection device 300 is coupled to receive image signals 315 from an image source 301, for example, an information handling system such as described further herein. In the illustrated exemplary embodiment, projection device 300 includes lamp ignitor circuitry 303 that is coupled via lamp power connection 309 to projector lamp 302 which may be, for example, a mercury vapor lamp.

In the exemplary embodiment of FIG. 3, ignitor detection circuitry 304 is configured to sense operation of lamp ignitor circuitry 303, e.g., by measuring lamp ignitor voltage provided by lamp ignitor circuitry 303 to projector lamp 302 via lamp power connection 309. An ignitor failure indicator 307 (e.g., LED light or other suitable indicator) is shown coupled to display an indication of lamp ignitor circuitry failure upon receipt of ignitor failure signal 313 provided by ignitor detection circuitry 304 upon detection of failure of lamp ignitor circuitry 303. Optional ignitor shutdown circuitry 310 is also shown present for receiving ignitor failure signal 308 and for in turn providing an ignitor shutdown signal 312 to shut down lamp ignitor circuitry 303. In this regard, it will be understood that an ignitor failure signal may be a separate signal 308 as shown, or may alternatively be the same signal as signal 313.

Still referring to FIG. 3, optional lamp ignition detection circuitry 305 may be provided that is configured to sense whether projector lamp 302 is ignited e.g., by measuring current provided by lamp ignitor circuitry 303 to projector lamp 302 via lamp power connection 309. A lamp failure indicator 306 (e.g., LED light or other suitable indicator) is shown coupled to display an indication of projector lamp failure upon receipt of lamp failure signal 311 from lamp ignition detection circuitry 305.

In the practice of the disclosed methods and systems, features of ignitor detection circuitry 304, optional lamp ignition detection circuitry 305 and/or optional ignitor shutdown circuitry 310 may be implemented using any suitable configuration of one or more circuits. For example, in one embodiment, one or more features of circuitry 304, 305 and 310 may be implemented using a controller (e.g., microprocessor and associated firmware) that is integral to projector 300 or using any other suitable configuration of microprocessor, firmware and/or software that interfaces with projection device circuitry/components. Discrete circuit devices may also be employed, e.g., ignitor detection circuitry 304 may be implemented using a comparator circuit or other suitable discrete circuit configuration.

The disclosed methods and systems may be implemented with any type of projection device that utilizes one or more projector lamps, e.g., table top projectors, projection televisions, etc. In one exemplary embodiment, the disclosed methods and systems may be implemented with projection devices that are configured to display images based on signals received from an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method of sensing lamp ignitor circuitry failure in a projection device, comprising:
   providing a projection device comprising lamp ignitor circuitry that is coupled by a power connection to a projector lamp;
   attempting to ignite said projector lamp using said lamp ignitor circuitry;
   sensing operation of said lamp ignitor circuitry while attempting to ignite said projector lamp coupled to said lamp ignitor circuitry by a power connection by measuring lamp ignitor voltage provided by said lamp ignitor circuitry to said projector lamp through said power connection; and
   providing an indication of ignitor failure based on a sensed failure in said operation of said lamp ignitor circuitry.

2. The method of claim 1, further comprising providing a controller integral to said projection device; and wherein said step of sensing operation of said lamp ignitor circuitry comprises using said controller to measure lamp ignitor voltage provided by said lamp ignitor circuitry to a projector lamp of said projection device; and wherein said providing an indication of ignitor failure comprises using said integral controller to activate an ignitor failure indicator based on a magnitude of said measured lamp ignitor voltage.

3. The method of claim 2, further comprising comparing a magnitude of said measured lamp ignitor voltage to a specified voltage magnitude; and activating said ignitor failure indicator if said measured voltage magnitude is less than said specified voltage magnitude.

4. The method of claim 2, further comprising:
   attempting to ignite said projector lamp;
   sensing whether said projector lamp is ignited; and
   activating a lamp failure indicator if said projector lamp fails to ignite.

5. The method of claim 4, wherein said step of sensing operation of said lamp ignitor circuitry is performed after the step of activating said lamp failure indicator.

6. The method of claim 1, further comprising providing a controller integral to said projection device; and using said integral controller to shut down said lamp ignitor circuitry based on a sensed failure in said operation of said lamp ignitor circuitry.

7. The method of claim 1, wherein said projection device is configured to display information based on signals received from an information handling system.

8. A system for sensing lamp ignitor circuitry failure in a projection device having lamp ignitor circuitry coupled to a projection lamp by a power connection, said system comprising:
   ignitor detection circuitry configured to sense operation of said lamp ignitor circuitry while said lamp ignitor circuitry is coupled to said projection lamp by said power connection; and
   an ignitor failure indicator coupled to said ignitor detection circuitry.

9. The system of claim 8, wherein said ignitor detection circuitry is configured to sense operation of said lamp ignitor circuitry by measuring lamp ignitor voltage provided by said lamp ignitor circuitry to said projector lamp of said projection device; and to activate said ignitor failure indicator based on a magnitude of said measured lamp ignitor voltage.

10. The system of claim 9, wherein said ignitor detection circuitry is configured to compare a magnitude of said measured lamp ignitor voltage to a specified voltage magnitude; and to activate said ignitor failure indicator if said measured voltage magnitude is less than said specified voltage magnitude.

11. The system of claim 10, wherein said ignitor failure indicator comprises an ignitor failure indicator light.

12. The system of claim 9, further comprising:
  lamp ignition detection circuitry configured to sense whether said projector lamp is ignited; and
  a lamp failure indicator coupled to said lamp ignition detection circuitry.

13. The system of claim 12, wherein said ignitor detection circuitry is configured to sense operation of said lamp ignitor circuitry after said lamp failure indicator is activated.

14. The system of claim 8, further comprising ignitor shutdown circuitry coupled to said ignitor detection circuitry and to said lamp ignitor circuitry, said ignitor shutdown circuitry being configured to shut down said lamp ignitor circuitry based on a sensed failure in said operation of said lamp ignitor circuitry.

15. The system of claim 8, wherein said projection device is configured to display images based on signals received from an information handling system.

* * * * *